Figures 1, 2:
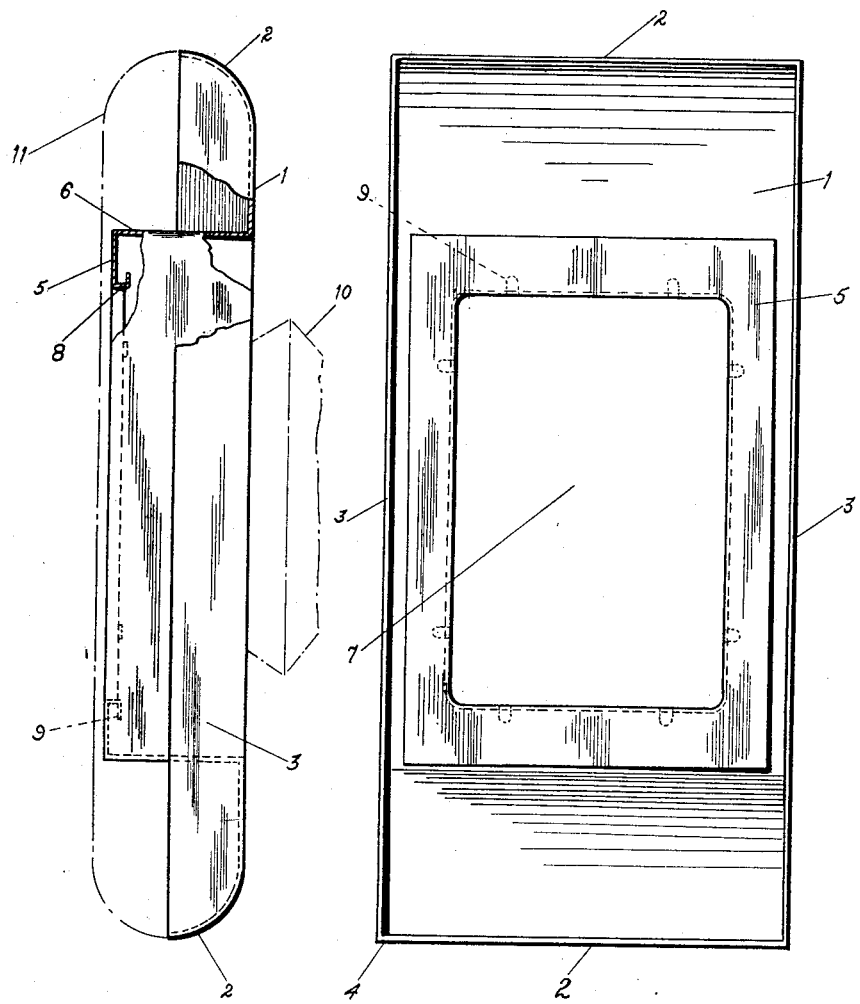

May 17, 1932.   C. A. BORNMANN   1,858,575
CAMERA BODY
Filed Aug. 18, 1930

INVENTOR.
CARL A. BORNMANN.
BY
ATTORNEY

Patented May 17, 1932

1,858,575

UNITED STATES PATENT OFFICE

CARL A. BORNMANN, OF BINGHAMTON, NEW YORK, ASSIGNOR TO AGFA ANSCO CORPORATION, OF BINGHAMTON, NEW YORK, A CORPORATION OF NEW YORK

CAMERA BODY

Application filed August 18, 1930. Serial No. 476,055.

This invention relates to a novel camera body, and consists in making the body of a one-piece stamping formed or pressed to the desired shape.

The primary object of the invention is to make a camera body cheaply since, by pressing out such an article by one or two operations of a stamping and forming machine instead of making several parts and assembling them, as has been done heretofore, a great saving of time and labor is effected as well as insuring a light tight body.

Another advantage is that a sturdier construction is obtained than that used heretofore, since a stamping may be made of a light metal, such as aluminum or other strong and ductile material. Whereas the use of such material for strength and good wearing quality is commonly known, to have made a camera body of several pieces of such material would make the cost prohibitive. Furthermore, in my invention there are no plurality of parts to become separated by use of the device.

For the attainment of the foregoing objects and such other objects as may hereinafter appear or be pointed out, I have illustrated one form of my invention in the accompanying drawings, in which—

Figure 1 represents a side elevation of my invention, partly in section, and showing the cover and the bellows in dotted lines; and Figure 2 shows the rear view of the device, with the cover removed.

Referring to the drawings, 1 designates the front of a camera body of trough-like formation, whose side elevation is oblong in shape. The short ends 2 of the oblong are shown curved concavely upwardly. The long sides 3 extend upwardly perpendicularly from the bottom and meet the curved sides in the corners 4. Centrally of the body a portion 5 is struck or pressed out substantially deeper than the rear edge of the trough, and is oblong in shape. The flanged rear face of the portion 5 is parallel with the front.

The walls 6 connect the front 1 and rear face 5. Centrally of the face 5 there is cut or stamped out an opening 7 of the same shape as the face 5. Along the periphery of the opening a continuous channel flange 8 is formed inwardly. On the inner or free edge of the flange are spaced flaps 9, bent radially outwardly therefrom and parallel to the face 5. These flaps serve as securing means for the camera bellows frame.

In dotted lines there is shown the camera bellows 10 which is secured to the body by means of the flaps 9. A cover, shown in dotted lines at 11, is adapted to fit over the rear face and is secured to the rim of the trough in any well known manner.

From the foregoing, it will be seen that the shape of the body is such as to be readily made of a one piece stamping out of a ductile metal, such as aluminum or the like. Conceivably, the device may be made of a light casting. Thus, my invention results in a great saving of labor; eliminates a multiplicity of parts; and results in considerable cheapening of production. Furthermore, there is formed a light tight, durable, and strong body prolonging the life of the camera.

Of course, changes may be made in details of construction and operation without departing from the spirit and scope of my invention. I do not limit myself therefore to the exact form herein shown and described other than by the appended claims.

I claim:—

1. A one piece polygonal stamping adapted for use as a camera body or the like, having a Z-shaped cross section, the outwardly directed foot of the Z terminating in an upward extension and the inwardly directed arm terminating in a hook shaped fastening means for bellows.

2. A one piece polygonal stamping for use as a camera body having a Z-shaped cross section, the foot thereof terminating in an upwardly curved extension along certain portions of the stamping and in an upwardly directed right angular flange along other portions of the stamping and hook shaped fastening means for bellows at the inner end of the arm of the Z-section.

3. A one piece oblong stamping adapted for use as a camera body and having a Z-shaped cross section, the foot of the Z-section terminating in an upwardly curved extension along the short sides of the oblong and in an upwardly perpendicularly directed flange along the long sides of the oblong, the inner end of the arm of the Z-section terminating in a downwardly perpendicularly directed flange having fastening means for bellows thereon, said inner downward flange defining an oblong opening in the stamping.

4. A one piece oblong trough like stamping adapted for use as a camera body, and having the short sides of the bottom thereof curved upwardly, said bottom having a central oblong portion struck upwardly perpendicularly therefrom, the top of said struck up portion being parallel to the bottom, said top having an oblong opening stamped out centrally therefrom, and fastening means for bellows secured in said opening.

5. A one piece oblong trough like stamping adapted for use as a camera body and having the short ends of the bottom thereof curved upwardly, said bottom having a central oblong portion struck upwardly perpendicularly therefrom, the top of said struck up portion being parallel to the bottom, said top having an oblong opening stamped out centrally therefrom, and a downwardly perpendicularly directed continuous flange defining the periphery of the opening, and flaps along the lower edge of said flange directed outwardly, said flaps adapted for fastening the camera bellows.

In testimony whereof, I affix my signature.

CARL A. BORNMANN.